United States Patent [19]

Lipes et al.

[11] Patent Number: 4,706,298
[45] Date of Patent: Nov. 10, 1987

[54] FUSED PLASTIC BAG CLOSURE AND APPARATUS FOR MAKING SAME

[75] Inventors: Arnold Lipes, Montreal; George Soga, Duverway, both of Canada

[73] Assignee: Packaging Automation Machinery Co. Ltd., Montreal, Canada

[21] Appl. No.: 889,211

[22] Filed: Jul. 25, 1986

[51] Int. Cl.⁴ ............................................. B65D 33/16
[52] U.S. Cl. ......................................... 383/71; 53/479; 156/253; 156/309.6; 156/499; 383/94
[58] Field of Search .................. 53/479, 379; 156/253, 156/309.6, 499; 383/71, 94; 206/620

[56] References Cited

U.S. PATENT DOCUMENTS

| | | | |
|---|---|---|---|
| 2,783,599 | 3/1957 | Weikert | 53/479 X |
| 3,038,651 | 6/1962 | Cloudsley | 206/620 |
| 3,111,794 | 11/1963 | Spolsino | 53/417 |
| 3,358,905 | 12/1967 | Soesbergen | 53/417 X |
| 3,372,797 | 3/1968 | Grevich | 156/253 X |
| 3,374,598 | 3/1968 | Piroutek | 156/253 X |
| 3,432,980 | 3/1969 | Seiferth et al. | 53/479 X |
| 4,159,077 | 6/1979 | Hall | 383/94 X |
| 4,188,769 | 2/1980 | Bright, Jr. | 383/94 X |

Primary Examiner—Stephen P. Garbe

[57] ABSTRACT

A plastic bag for retaining a content therein and wherein the bag has a gathered throat portion adjacent an end opening thereof, the gathered throat portion being formed by randomly disposed wall portions of the plastic material fused together by two or more rows of adjacent spaced apart fused zones of plastic material disposed about a plurality of needle holes. The apparatus comprises at least one set of opposed gathering jaw plates for gathering, in a random fashion, a circumferential portion of the plastic bag adjacent the end opening thereof to form a gathered throat portion. Two pressing plates are disposed on a respective side of the gathered throat portion and are each provided with two or more spaced apart rows of needle receiving bores disposed adjacent one another in differing planes. A needle support block of heat conductive material has needles secured thereto for conducting heat from the block. The block is connected for movement to and away from one of the pressing plates once the pressing plates have moved to a pressing position so that the needles will enter the bores of both pressing plates to puncture a press portion of the gathered throat portion of the bag to fuse plastic material adjacent randomly disposed wall portions of the plastic material in the areas of the penetrating needles and in adjacent spaced apart planes.

12 Claims, 7 Drawing Figures

FUSED PLASTIC BAG CLOSURE AND APPARATUS FOR MAKING SAME

BACKGROUND OF THE INVENTION

1. Field of Invention

The present invention relates to an improved fused closure for a plastic bag and an apparatus for effecting the closure. The closure consists of a randomly gathered throat portion of a plastic bag being fused together by at least two or more spaced apart rows of heat conductive needles penetrated in the throat portion.

2. Description of Prior Art

The open ends of many plastic bags are usually sealed by gathering a portion of the bag and placing a twist wire about the gathered throad portion or else applying a removable securement tab or the like elements. A disadvantage of such closure elements is that they are often not properly secured to the bag and become easily undone. Also such elements require special machinery for application thereof to a filled bag throat portion. Further, it is often necessary to stop the bagging machinery whereby to correct a malfunction in such wire or tab applicator or to load the applicator with closure tapes or tabs. Such applicator devices are also time and labor consuming and often require adjustment or repair when parts becomes defective or worn. Most prior art closure devices are also not tamper-proof and can easily be removed from such bags.

The present invention overcomes the above-mentioned disadvantages by providing a novel seal for a plastic bag wherein the throat portion is heat sealed by the use of heated penetrating needles. In the prior art, it is known to heat seal a plastic bag by the use of heated penetrating needles. Reference is made to U.K. Pat. No. 2034278 which discloses a method and apparatus for effecting this type heat seal. However, the disadvantage of that method and apparatus is that the plastic bag must be oriented vertically so as to have its open end in an erect position, and it is then necessary to fold this open end portion of the bag into a specific zig-zag fashion before the bag is pierced with warm needles. This is often difficult with a product in the bag. This is also time consuming and still does not provide a weld seam which is rigid and which does not become accidentally undone. In order to solve this problem, the Patentee has proposed folding over the upper end of the bag before the heat seal is made, and this again makes the process even more time consuming, difficult and expensive.

SUMMARY OF INVENTION

It is a feature of the present invention to provide a novel plastic bag seal which does not require a closure device, thus reducing cost, and apparatus for effecting the closure and which substantially overcomes all of the above-mentioned disadvantages of the prior art.

Another feature of the present invention is to provide a plastic bag seal formed in a randomly gathered throat portion and having at least two or more rows of spaced apart fused zones of plastic material disposed about a plurality of needle holes.

Another feature of the present invention is to provide a plastic bag seal wherein the fused needle holes in at least two or more rows are offset from one another.

According to the above features, from a broad aspect, the present invention provides a plastic bag for retaining a content therein. The bag has a sealed gathered throat portion adjacent an end opening thereof. The sealed gathered throat is formed by randomly disposed wall portions of plastic material fused together by two or more rows of spaced apart fused zones of plastic material disposed about a plurality of needle holes.

According to a further broad aspect of the present invention there is provided an apparatus for fusing a gathered throat of a plastic bag. The apparatus comprises means for gathering in a random fashion a circumferential portion of a plastic bag adjacent an end opening thereof to form a gathered throat portion. Pressing means are provided for pressing together randomly disposed plastic material in the gathered throat portion. The pressing means has two or more spaced apart rows of needle receiving bores disposed adjacent one another in differing planes. Fusing means is provided which has two or more rows of heat conductive needles movable in and out of the bores and across the plastic material in the gathered throat portion to fuse plastic material of adjacent randomly disposed wall portions of the thermal plastic material in the area of the penetrating needles and in adjacent spaced planes.

BRIEF DESCRIPTION OF DRAWINGS

A preferred embodiment of the present invention will now be described with reference to the accompanying drawings, in which.

DESCRIPTION OF PREFERRED EMBODIMENTS

Figure 1:
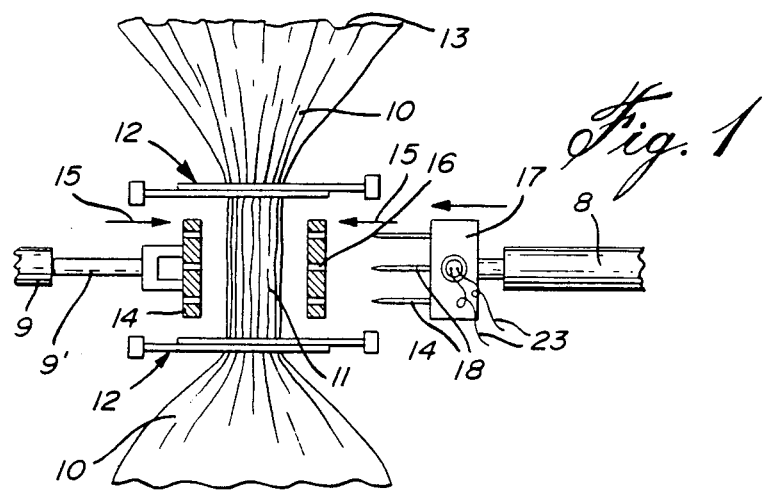
FIG. 1 is a schematic view illustrating the fusing apparatus of the present invention.

Referring now to the drawings, and more particularly to FIG. 1, there is shown an apparatus for fusing a gathered throat portion 11 of a plastic bag 10. The apparatus comprises gathering means in the form of two pairs of jaw plates 12 which are spaced apart to gather a circumferential portion of the bag 10 adjacent the open end 13 of the bag. A pair of pressing plates 14 is provided with each plate disposed on opposite sides of the gathered throat 11 and one or both are movable inwardly towards one another in the direction of arrows 15 whereby to press the gathered throat portion to collapse adjacent randomly disposed wall portions of the plastic material into facial contact between parallel opposed surfaces of the plates. These pressing plates 14 are provided with needle bores 16 in at least two or more spaced apart rows 21 (see FIG. 3) of needle receiving bores 16. The pressing plates 14 are also connected to a piston rod 9' of a respective piston cylinder 9 to effect a synchronous displacement thereof. A fusing means, in the form of a heat conductive body or block 17 having a plurality of needles 18 disposed in two or more rows, and associated with respective bores 16, is movable by a piston 8 towards one of the pressing plates 14 after the pressing plates have collapsed the random gathered throat portion of the bag whereby to penetrate the bag material and fuse the plastic material about the needle holes made by the heated needles whereby to form at least two rows of spaced apart fused zones of plastc material disposed about these needle holes.

Figure 2:
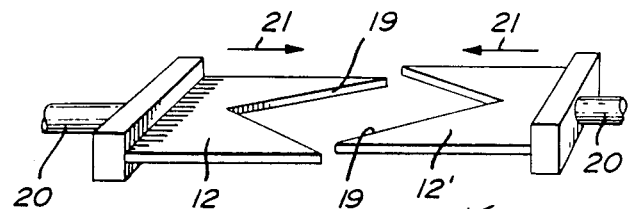
FIG. 2 is a perspective view illustrating an example of the construction of the gathering jaw plates.

As shown in FIG. 1, there are two sets of opposed parallel gathering jaw plates 12. However, it is pointed out that there may be provided only a top or bottom gathering means such as the jaw plates 12 and the bag material can be made to abut or enter a stationary jaw member when moved therein by displacing the top jaw plate whereby to form the throat 11 portion of the bag. As shown in FIG. 2, each set of jaw plates comprises opposed plates 12 and 12' each having a jaw opening 19 at an end thereof. The jaw opening as herein shown is a V-shape opening gradually tapering to a narrow gathered zone 19' wherein the bag is finally gathered. This is effected by having each plate 12 and 12' disposed in closely spaced parallel planes with the jaw openings 19 facing one another. Displacement means in the form of piston rods 20 move the jaw plates towards one another in the direction of arrows 21 whereby to gather a peripheral portion adjacent the open end 13 of the bag to form the restricted throat portion, as shown in FIG. 1. After the throat portion is formed, the jaw plates move the bag between the pressing plates 14 or the pressing plates move into position. It is pointed out that one of the jaw plates 12 or 12' may be replaced by any bag engagement means to displace the bag material in the throat region of the bag, into the jaw opening 19 of the jaw plate.

Figure 4:
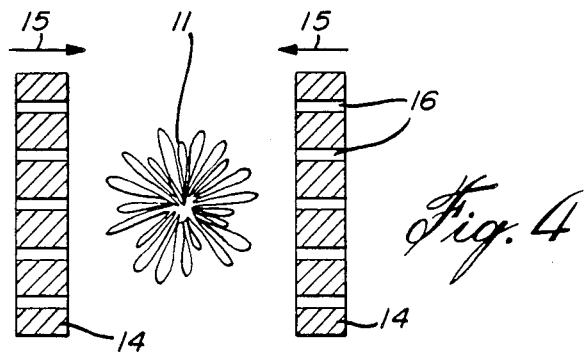
FIG. 4 is a simplified top view, partly in section, illustrating the position of the gathered bag portion with respect to the pressing plate.
Figure 5:
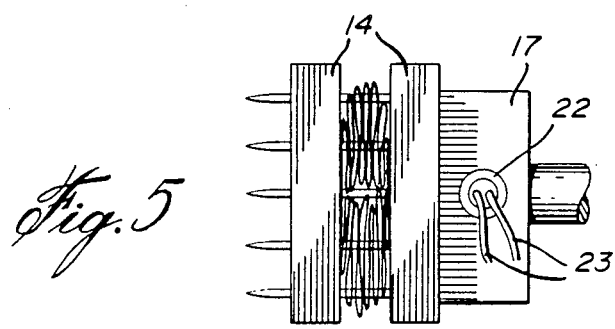
FIG. 5 is a fragmented side view illustrating the position of the press plate, the throat portion of the bag and the needle support block during a fusing cycle.

Referring now to FIG. 4, there is shown the position of the gathered throat portion 11 with respect to the pressing plates 14. As herein shown, the throat portion 11 is formed of randomly disposed wall portions of the plastic bag. By moving the pressing plates in the direction of arrow 15, the throat portion is compressed whereby the randomly disposed wall portions of the bag material are pressed together so that adjacent wall portions are placed in facial contact. This is illustrated in FIG. 5.

Figure 3:
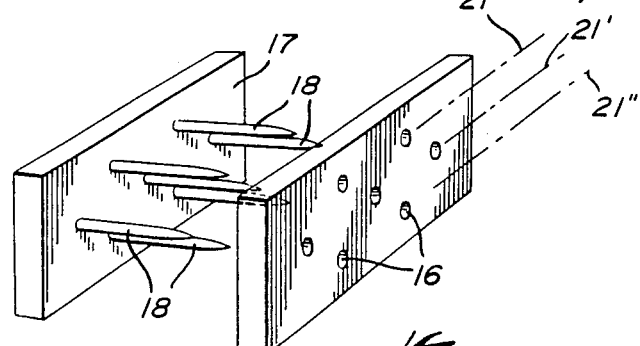
FIG. 3 is a simplified perspective view illustrating the construction of the pressing plates and the heated needle block.

The pressing plates are better illustrated in FIG. 3 and as shown comprise three rows, namely rows 21, 21' and 21" of needle receiving bores. Also, it can be seen that the bores in the outer rows, namely rows 21 and 21" are offset from the bores in the center row 21'. This provides for a more rigid seal. It has been found that if only a single row of sealing holes are utilized, the seal is not strong enough and will accidentally break when goods are in the sealed bag and the seal is subjected to normal stress. Also, the needles 18 are disposed on the block 17 in a similar row fashion as the disposition of the needle bag 16.

Referring again to FIG. 5, there is shown in schematic form the construction of the needle support body or block 17, and as the block includes a resistive element 22 disposed therein and connected to a source of electricity via wires 23 whereby to heat the support block 17 and consequently the needles 18 which are also constructed of heat conductive material. In a preferred embodiment the needles are constructed of tungsten steel while the support block is constructed of brass. However, other heat conductive materials may be utilized. To effect the heat seal, block 17 is moved in close proximity to one of the pressing plates 14 and immediately retracted therefrom. This permits the needles 18 to penetrate through the randomly gathered throat portion 11 of the bag to melt plastic thereabout to effect a plurality of pin seals in adjacent rows. It is pointed out that it is important to have at least two rows of fused pin seals whereby to add rigidity to the closure. It is also preferable, although not essential, that the pin seals in one row be offset from the fused pin seals of the adjacent rows. This provides still further strength to the seal as the pin seals support one another. If a single line of pin seals were used, it would provide a very weak seal, as above mentioned.

Figure 6:
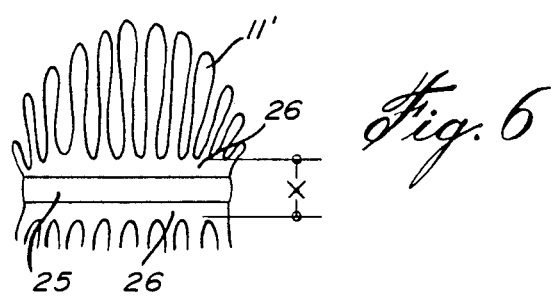
FIG. 6 is an enlarged fragmented section view illustrating the fused zone of plastic material about a needle hole.
Figure 7:
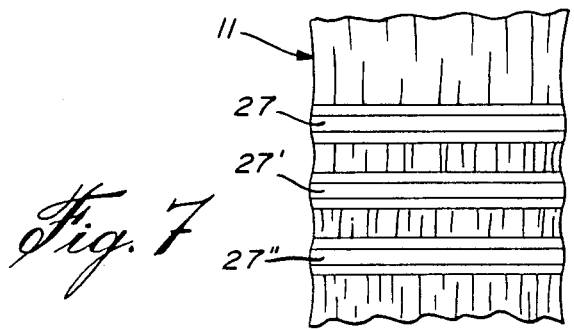
FIG. 7 is an enlarged section view of the fused throat portion illustrating three rows of fused needle holes.

FIGS. 6 and 7 are enlarged view showing the structure of the pin seals 27 in the fused zones. FIG. 6 illustrates one of these fused pin seals as being the area designated by the section "x" about the needle hole 25. As herein shown, the random pleats 11' of plastic material of the wall portions in the periphery of the throat portion have fused together to form a solid plastic wall 26 about the needle hole 25. FIG. 7 shows the disposition of three rows 27, 27' and 27" of fused pin seals extending across the throat portion 11 and corresponding to the rows of needles and holes 21, 21' and 22" in the pressing plate 14 and needle support block 17.

It is within the ambit of the present invention to provide any obvious modifications of the examples of the preferred embodiment as described herein, provided such modifications fall within the scope of the appended claims.

We claim:

1. An apparatus for fusing a gathered throat portion of a plastic bag, said apparatus comprising means for gathering in a random fashion a circumferential portion of a plastic bag adjacent an end opening thereof to form a gathered throat portion, pressing means for pressing together randomly disposed plastic material in said gathered throat portion, said pressing means having two or more spaced apart rows of needle receiving bores disposed adjacent one another in differing planes, and fusing means having two or more rows of heat conductive needles movable in and out of said bores and across said plastic material in said gathered throat portion to fuse plastic material of adjacent randomly disposed wall portions of said thermoplastic material in the area of said penetrating needles and in adjacent spaced planes.

2. An apparatus as claimed in claim 1 wherein said bores in one of said planes are offset from said bores in an adjacent plane.

3. An apparatus as claimed in claim 2 wherein there are three spaced apart rows of needle receiving bores and heat conductive needles.

4. An apparatus as claimed in claim 1 wherein said means for gathering comprises at least one set of opposed gathering jaw plates each having a tapering jaw opening at an end thereof, said plates being displaceable towards one another in closely spaced parallel planes with said jaw openings facing one another with a portion of said bag adjacent said end opening extending between said jaw openings whereby to progressively gather a portion of a bag to form said gathered throat portion.

5. An apparatus as claimed in claim 4 wherein there are two pairs of opposed gathering jaw plates, each pair being disposed in a respective one of two spaced apart parallel planes, said gathered throat portion being defined as said gathered bag portion between said two pairs of jaw plates.

6. An apparatus as claimed in claim 4 wherein said pressing means comprises two pressing plates disposed between said two pairs of opposed gathering jaw plates and on a respective side of said gathered throat portion, said pressing plates being connected to displacement means to move said plates towards one another with a pressing surface of each said plates disposed in parallel relationship with one another whereby to press together said randomly disposed wall portions of said thermoplastic material whereby said randomly material is pressed together so that adjacent random wall portions of plastic material are placed in facial contct.

7. An apparatus as claimed in claim 6 wherein said fusing means comprises a needle support body of heat conductive material, a resistive element disposed within said body for heating same, said needles being secured to said body and made from heat conductive material for conducting heat from said body, said body being connected for movement to and away from one of said pressing plates once said pressing plates have moved to a pressing position whereby said needles will enter said bores to puncture said randomly disposed wall portions of said thermoplastic material and fuse it together in the periphery of each needle to form at least two spaced apart rows of fused pin seals formed by melted plastic material about said heat conductive needles.

8. An apparatus as claimed in claim 8 wherein there are three of said spaced apart rows of needle receiving bores in said pressing plates and three rows of needles in said support body, said needles and holes of the outside rows being offset from said needle and holes of a center one of said three rows.

9. A plastic bag for retaining a content therein, said bag having a sealed gathered throat portion adjacent and end opening thereof, said sealed gathered throat being formed by randomly disposed wall portions of plastic material fused together by two or more rows of spaced apart fused pin seals of melted plastic material disposed about a plurality of needle holes.

10. A plastic bag as claimed in claim 9 wherein said rows of holes constitute tear lines to permit a top portion of said bag to be torn on said tear lines to provide an open end for access to the contents of said bag.

11. A plastic bag as claimed in claim 10 wherein there are three rows of said holes.

12. A plastic bag as claimed in claim 10 wherein said needle holes in one of said rows are offset from said needle holes of an adjacent row.

* * * * *